March 24, 1970 W. R. WOODALL 3,502,526
METHOD OF MANUFACTURING A TWIN BEAD PNEUMATIC
TIRE ON A FLAT BUILDING DRUM
Filed Feb. 6, 1967 3 Sheets-Sheet 1

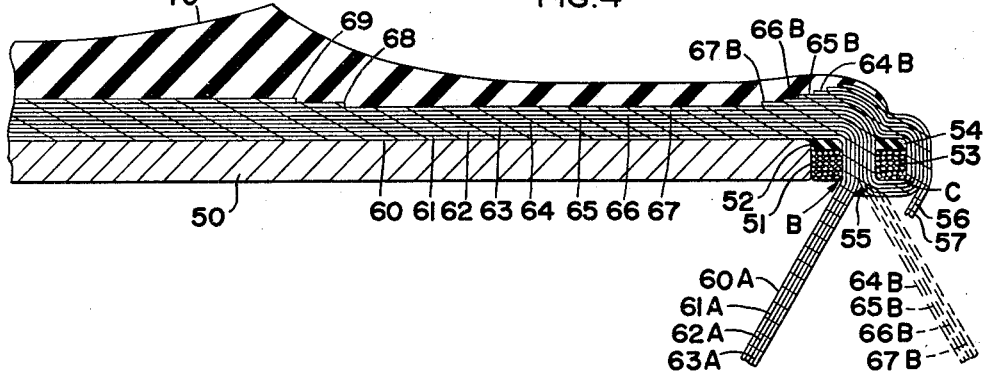
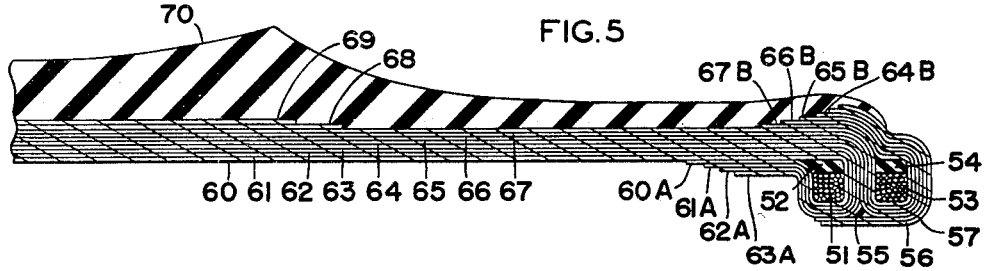
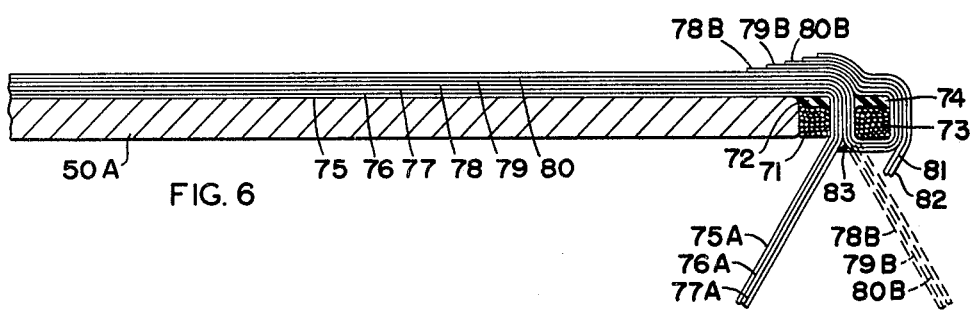
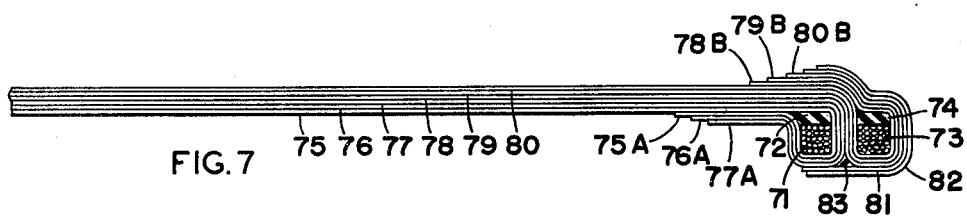

United States Patent Office 3,502,526
Patented Mar. 24, 1970

3,502,526
METHOD OF MANUFACTURING A TWIN BEAD PNEUMATIC TIRE ON A FLAT BUILDING DRUM
William Robert Woodall, Akron, Ohio, assignor to The Firestone Tire & Rubber Company, Akron, Ohio, a corporation of Ohio
Filed Feb. 6, 1967, Ser. No. 614,331
Int. Cl. B29h 17/24
U.S. Cl. 156—132                    4 Claims

ABSTRACT OF THE DISCLOSURE

This invention relates to a new method for building a twin bead pneumatic tire on a flat building drum. This novel method comprises firstly, setting a first bead bundle at the edge of the flat drum; secondly, applying the body plies to the flat drum and turning down the ply edges around the first bead bundle; thirdly, setting a second bead bundle axially outwardly of the first bead bundle and concentric therewith; and lastly, engulfing the two bead bundles with groups of body plies.

---

This invention relates to twin beaded tires and a method of manufacturing the same. By the method of this invention, a twin bead tire can be manufactured on what is known in the art as a flat tire building drum. This invention is applicable to any twin bead tire; that is, airplane, truck, off-the-road, racing, etc. which has two bead bundles in at least one of the two tire bead areas. It can be either of radial ply or of conventional construction.

The manufacturing of tires on a flat building drum has in the prior art always been limited to single bead tires (tires with one bead bundle in each bead area—a total of two bead bundles in the entire tire) as exemplified by the following quotation which appears on page 68 of Pneumatic Tyre Design (1952) by E. C. Woods:

"The flat drum can be used only when the tyre construction employs single beads (i.e., single metallic cores in each bead), for these allow the fabric to pull-around during molding."

It was and is a well known limitation that any twin bead tire must be built on a contour type building drum because with the prior art construction it would be impossible to build a satisfactory twin bead tire on a flat drum as the individual plies would not undergo the same expansion upon shaping and curing and the tire would have severe wrinkles in the outer plies. This is the case even though the advantage of building a tire on a flat drum as opposed to a contour drum are well known to persons in the art. With a contour drum the amount of manual labor is significantly greater than with a flat drum in that each ply must be turned down around the contoured edge of the drum (radially inward of the drum) by hand (what is called "paddling" in the art) and then likewise turned up by hand around the bead bundle after the bead bundle has been set in place. In certain cases, machinery has been made to utilize mechanical stitching techniques for contour drums. These generally result in a pronounced problem of wrinkles in the bead area and the attendant loss of uniformity which these wrinkles perpetuate. This paddling process consumes a great deal of time and labor and is, therefore, quite expensive. It also leads to a less uniform tire due to wrinkles in the turned-up part of the plies and turned-down part of the plies. With a flat drum there is no need for the extensive paddling as the ply turn-up or turn-down may be made by automatic stitchers. This is, of course, due to the fact the ply ends need not be shaped over the contour edges of the drum but are merely wrapped around the beads. Also, a flat drum built tire is easier to shape and vulcanize. It is less prone to trap air between the curing bladder and the tire than the contour drum built tire. Due to the undercut profile of the bead of the green tire (uncured) as it is built on a contour drum, air can easily be trapped in the undercut area. The flat drum built tire has no such undercut profile.

Basically the well-recognized advantages of a flat tire building drum over a contour tire building drum are:

(1) Less manual labor
(2) Less time of manufacture
(3) Less expensive to produce
(4) More uniform finished tire
(5) Better curing profile Even with these advantages in mind, it has been impossible with the prior art construction to build a twin bead tire on a flat drum. FIG. 1 of U.S. 3,057,391 and FIG 2 (the dotted line) of U.S. 3,068,926 and U.S. 1,989,956 are, by way of example, the prior art twin bead tire and method of building the twin bead tires. The prior art thinking was that in a twin bead tire you could not get the rotation of the plies around the bead bundles that occurs in the shaping of a flat drum built tire. Therefore, the twin bead tire must be built with the bead area in essentially the same position it has in the shaped and cured tire. This thinking necessitated a building drum of the contour shape—see column 1, line 6–14 and column 3, line 26–37 of U.S. 1,989,956.

It is an object of this invention to provide a method of building a multiple bead tire (twin bead) on a flat drum and thereby obtain the advantage of flat drum tire building over contour drum tire building.

Another object of this invention is to provide a twin bead tire construction that is capable of being built on a flat tire building drum.

A still further object of this invention is to provide a method which makes the building of the first stage of a twin bead radial ply tire on a flat building drum possible.

Further objects of this invention will become apparent from the following description.

FIGURE 4 is a cross-sectional view of the lay-up of the tire when built by the method of the invention on a flat building drum showing one half of the tire and building drum, the other half being the mere mirror image of the half shown. This figure shows the tire when built by the method of this invention as it appears on a flat building drum.

FIGURE 5 is a one half cross-sectional view of the green tire of FIG. 4 after it has been removed from the building drum and finished by turning-up the inner ply ends and stitching the chafer strips completely in place. This tire is ready for vulcanizing to the state shown in FIGURE 3.

FIGURE 6 is one half of the cross-sectional view of the first stage of a twin bead radial ply tire on a flat building drum when built by the method of this invention. The other half is the mirror image of the part shown.

FIGURE 7 is a one half cross-sectional view of the tire body of FIGURE 6 after it has been removed from the flat building drum and completed. It shows the tire body ready for the conventional second stage of building.

In referring to a bead bundle, this includes any conventional tire bead construction, whether it be a single wire core, a series of adjacent individual wire strands held together by rubber bead insulation or a series of convolutions of layers of parallel bead wires. These bundles can include rubber insulation around the bead wires, a bead reinforcing strip of cord reinforcement as is commonly known in the art wrapped completely around the circumference of the bead wire or a series of bead reinforcing strips.

Figure 1:
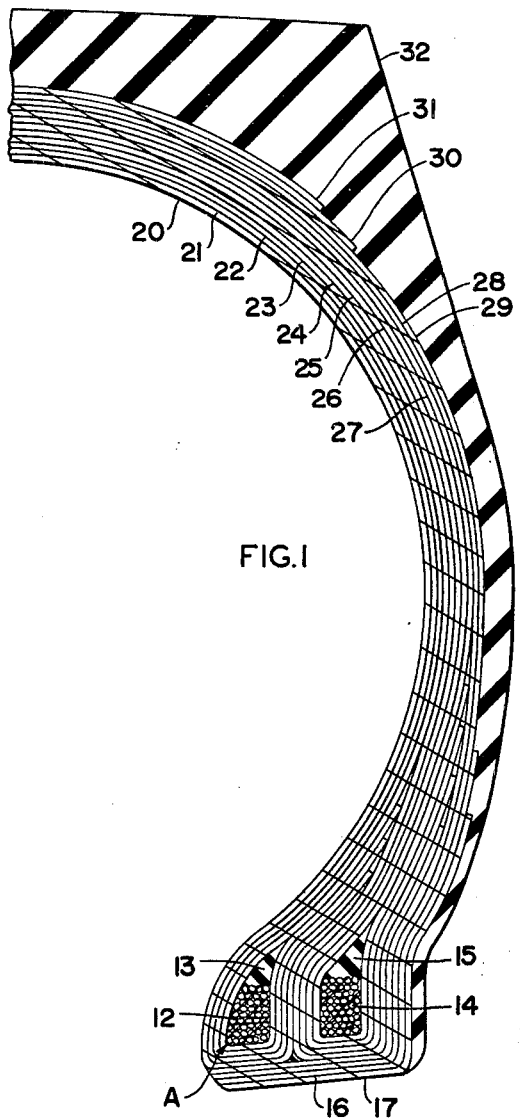
FIGURE 1 is a one half cross-sectional view of the vulcanized prior art twin bead tire. The other half is the mirror image of the half shown.
Figure 2:
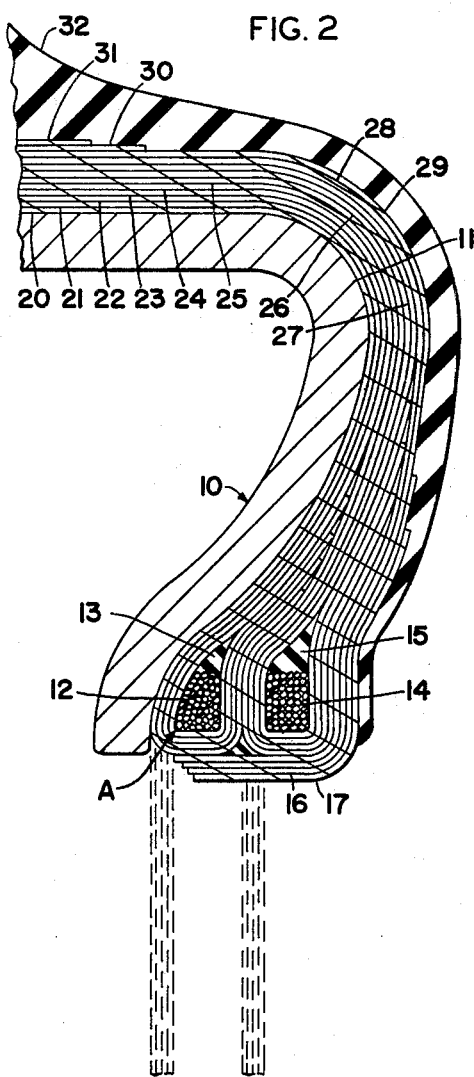
FIGURE 2 is a cross-sectional view of the lay-up of the prior art twin bead tire on the prior art contour shaped building drum showing only a partial cross-sectional view of the tire and building drum. The figure shows the prior art tire as it would appear on the contour building drum.

FIGURE 1 is an example of the prior art twin bead tire as it appears in a vulcanized state. FIGURE 2 is the same tire as it would appear on the contour building drum of the prior art in an unvulcanized state (green state). When referring to the building steps, it is also understood identical steps must be undertaken for the part not shown. In these two drawings the prior art construction and method of building are illustrated. A tire with ten body plies is illustrated but it is understood that any of a various number of plies can be used in various combinations of turn-up and turn-down plies. Referring to FIGURE 2, onto the cylindrical contour building drum 10 are placed plies 20, 21, 22 and 23. These plies may have cords at the conventional bias angles to the circumferential center line of the tire; forming what is called a "conventional bias tire" in the art with the cords of each ply running in the opposite direction of its immediately adjacent ply, that is, 20 has cords running to the left, 21 to the right, etc. as they are applied to the building drum. Each ply is formed around the contour edge 11 of the building drum by the tire builder manually turning it down with the air of a hand paddle (this process is termed "paddling" in the art) to the positions shown by the dotted lines. After the piles are turned down, the first bead bundle 12 and its corresponding bead filler strip 13 are set in place laterally outside the turned-down plies. The turned-down ply ends are then manually turned-up around the bead bundle completely engulfing the bead and paddled into place by the tire builder.

Next plies 24, 25, 26, and 27 are placed on top of ply 23 in the same manner that the plies 20, 21, 22, and 23 were placed. The ply ends of 24, 25, 26, and 27 are then turned-down around the contoured edge of the drum and manually paddled into place laterally outside the turned-up inner plies as shown by the dotted lines. The second bead bundle 14 and its corresponding bead filler strip 15 are set in the same manner as the first. The outer ply ends are manually turned-up around bead bundle 14 and paddled into place. The outer two body plies, 28 and 29, are placed radially outwardly of ply 27 and manually turned-down and stitched around the entire bead thusly covering the two bead bundles and their corresponding turned-up plies as shown in the FIGURE 2.

Then as is commonly known in the art, tread plies (or breaker plies), (depicted as 30 and 31) may or may not, at the discretion of the tire designer, be placed on top of outer body ply 28 in the tread area. Tubed tread and sidewall 32 is then placed on top of the finished tire body. Also chafer strips, abrasion gum strips, and pre-cured abrasion gum strips or any combination thereof may be placed in the bead axially outwardly of the final body ply. In the FIGURES 1 and 2, two chafer strips, 16 and 17, are depicted as being placed laterally outside of outer body ply 29.

The tire drum 10 of FIGURE 2 is broken down and the tire is removed, bagged, or shaped and vulcanized to give the vulcanized tire depicted in FIGURE 1.

Figure 3:
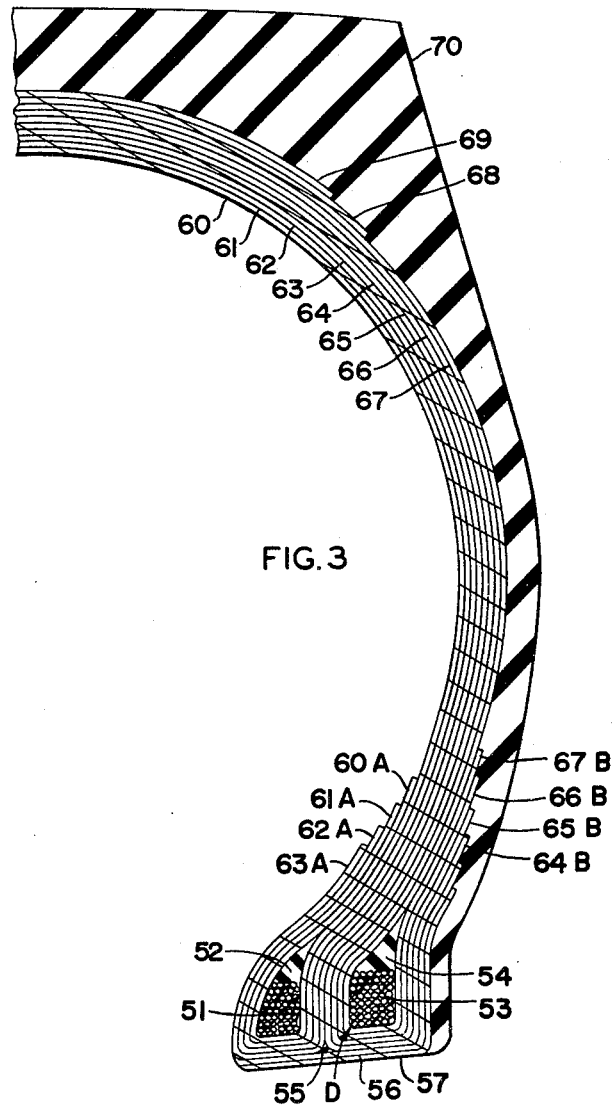
FIGURE 3 is a one half cross-sectional view of the vulcanized twin bead tire built by the method of the invention. The other half is the mirror image of the half shown.

FIGURES 3, 4, and 5 shows a tire which is built by the method of the invention which is building the twin bead tire on a flat building drum. Again the figures show one half the cross-section of the tire and drum, divided vertically with it being understood that the other half is the mirror image of the one shown and that comparable steps in the building process must be performed for the omitted half as for the illustrated half. FIGURE 4 shows a flat tire building drum 50. Firstly, the axially inner or first bead bundle 51 and its corresponding bead filler 52 are placed adjacent to the edge of the flat drum 50. The body plies, 60 through 67, are then placed on the drum, one at a time or in suitable combinations with one another, and the ply ends of the plies are stitched down around the inner bead bundle 51 in the manner familiar in the prior art. The ply ends in this position are shown as 60A through 63A and as dotted lines 64B through 67B. These plies may have their cord paths constitute a bias angle to the circumferential center line of the tire with the angle in adjacent plies alternating, that is, 60 to the left, 61 to the right, 62 to the left, etc. In calculating the drum width, the tire design engineer considers the drum width to be the sum of the actual drum width plus twice the width of the inner bead bundle. The drum width, along with various other factors (cord bias in the ply, circumference of the ply, width of the plies, degree of expansion from green to cured tire, etc.) is critical in the design of a tire. This concept of design will be discussed later.

The second or axially outer bead bundle 53 and its corresponding bead filler 54 are set adjacent to the first bead bundle and axially outside the plies; ply ends 60A through 63A left hanging radially inwardly. The ply ends of the outermost four plies, 64B through 67B, are turned-up around the second bead bundle 53 and stitched in place engulfing this bundle. The ply ends are shown in this position by the solid lines 64B through 67B. Tread plies may or may not, at the discretion of the tire design engineer, be placed in the tread area on top of the outermost body ply 67. The drawings, FIGURES 3, 4 and 5, depict two tread plies, 68 and 69, so placed. A tubed tread and sidewall 70 is then placed upon the finished tire body in the conventional manner. Bead base filler strip 55 is applied as shown in the areas between the turned-up outer plies and the inner plies; between plies 63 and 64. Chafer strips, abrasion gum strips, or pre-cured abrasion gum strips, or any combination thereof may be placed in the bead area axially outwardly of the last body ply. Two chafer strips, 56 and 57, are shown in FIGURES 3, 4 and 5 as being situated in this manner. The chafer strips are turned-down around the outer bead bundle as far as possible but these cannot be completely turned due to the presence of the "dangling" ply ends of the inner plies 60A through 63A. The tire, as stripped from the flat drum, would have the ply ends of body plies 60 through 63, and the ends of chafers 56 and 57 dangling, or not stitched down.

Referring to FIGURE 5, the green tire stripped, from the drum after the drum is collapsed. The dangling ply ends of the body plies 60 through 63 are then folded back around the first bead bundle 51 and stitched into place. Likewise chafers 56 and 57 are turned-down completely to engulf the bead seat. This figure shows the tire so completed and ready to be vulcanized. This turning-down step may be done by the builder after he strips the tire from the drum, or the tires so stripped may be sent to a central location where this turning-down step can be accomplished by machine. The tire thusly finished is bagged, and vulcanized in the conventional way to give the vulcanized tire construction shown in FIGURE 3.

In FIGURE 6, the first stage of a radial ply tire built by the method of this invention is shown. The view is a one-half cross-sectional view showing the twin bead radial tire body on a flat building drum. A radial ply tire consists of a tire body in which the cords of all the plies run radially with respect to the tire, or stating it in another way, in which the cords of all the body plies run at approximately an angle of 90° to the circumferential center line of the tire tread. Along with the radial body, the tire contains an inextensible belt located as a tread ply belt. The most widely known constructions of radial ply tires are the Michelin X triangulation tread ply belt and the Pirelli Cinturato low cord angle belt. The method of this invention of building the first stage of a twin bead radial ply tire on a flat drum may be employed no matter what belt construction is used.

The radial ply tire is conventionally built in two stages; a first stage on a conventional flat or contour tire building drum in which the tire body is built and a second, or finishing stage occurs on an inflatable diaphragm where the inextensible tread ply belt and tread are added. The tire body, in a cylindrical shape, which has been completed to the point of adding the tread ply belt is removed from the first stage tire building drum and placed on an inflatable bladder type second stage expanding machine where the tire body is changed into a toroidal shape by inflating the bladder drum, thereby bringing the tire body out to meet the inextensible tread ply belt at the belt's inner circumference. The belt and tread and sidewall are then applied in the conventional manner. A construction method utilizing this invention occurs in the first stage of building the radial ply tire.

In FIGURE 6, the flat building drum 50A has the axially inner bead bundle 71 and its corresponding bead filler 72 placed immediately adjacent the edge of drum 50A. The reinforcing cord body plies which have all the cords substantially at an angle of 90° to the circumferential center line of the drum or, stated in another way, parallel to the axis of the drum, are applied to the drum in the conventional manner individually or in groups with each ply being turned-down around the bead bundle 71 at the edge of the drum. In FIGURE 6, the ply ends of six body plies, 75 through 80, applied in this manner are indicated as 75A through 77A and the dotted lines 78B through 80B. The axially outer bead bundle 73 and its correspondent bead filler 74 are next located adjacent the first bead bundle but laterally outside the turned-down body plies, as shown in FIG. 6. Any number, at the discretion of the tire design engineer, of the body plies are next turned-up around the outer bead bundle 73 and stitched into place completely engulfing the said outer bead bundle. This is indicated by the solid lines 78B through 80B. A strip or rubber, the bead base filler 83, next is applied at the point where the outer plies began to go axially outwardly around the outer bead bundle and between the last inner ply 77 and the first outer ply 78 as shown in FIG. 6. A bead chafer strip, bead abrasion gum strip, or a pre-cured abrasion gum strip, or any combination thereof may then be applied axially outside the turned-up outer plies and stitched down as far as possible until the inner body ply ends which have not yet been turned-up prevent any more stitching. FIG. 6, by way of illustration, shows two chafer strips, 81 and 82, so applied. Next the flat drum is collapsed and the tire body is stripped from the drum. The inner body ply ends 75A, 76A, 77A are then turned-up, back around and completely engulfing the inner bead bundle 70 and the chafer strips, if present, 81 and 82 are stitched completely down to cover and protect the bead seat of the tire. FIG. 7 shows the tire body after it has been removed from the flat drum, the turn-ups have been made on the inner body plies, and the chafer completely stitched down. It is now ready to be finished by the second stage building. In this manner the first stage of building a radial ply tire is completed by the method of this invention. The tire body so completed is finished on the inflatable bladder in the second stage building. The second stage is accomplished in the conventional manner. It is presently known to complete both the stages of the radial tire on one machine by employing, in essence, a dual bladder type building drum. The method of this invention could also be used in this situation.

The radial ply tire containing the construction of this invention and built by the method of this invention may contain the conventional materials in the inextensible tread ply belt, that is, wire cords, fiber glass cords, synthetic cords—rayon, nylon, polyesters, etc. or combinations thereof. The body plies may also contain any of the above mentioned materials. The number of body plies is at the discretion of the tire design engineer. FIGURE 6 illustrates the construction when fiber glass or any of the types of synthetic cord is used as the cord of the body plies, when wire cord body plies are used the preferred construction would contain two wire cord body plies. Both body plies in this type construction would pass between the two bead bundles with the innermost body ply being wrapped back and around the inner bead bundle (in the same manner as ply 75 is wrapped around bead bundle 71 in FIGURE 7) and the outermost body ply being wrapped around and up to engulf the second bead bundle (in the same manner as ply 78 is wrapped around bead bundle 73 in FIGURE 7). In this type construction, the six body plies, 75 through 80, of FIGURE 5 are replaced by two wire cord plies, the innermost being turned around the first bead bundle and the outermost being turned around second bead bundle.

Twin bead tires of the radial type have been mostly constructed with wire cords in the inextensible tread ply belt and either wire cord or synthetic cord in the body plies. Examples of the first is the Michelin X and Firestone W2, and an example of the latter is the Firestone W2A. This invention can be utilized in any of the above constructions.

The critical factor a tire design engineer must consider is the actual length of the cords in the ply. In determining what cord length is needed the bias angle of the cord, the expansion from the green tire shape to the cured tire shape, and the width of the building drum are all factors that must be taken into consideration. If the cord length is too short, the cord will not be long enough to take the expansion when it is shaped. This will cause a "tight" condition in the ply and if severe enough, will pull the ply ends down around the bead thereby weakening the ply's hold on the bead. If the cord length is too long, on expansion of the green tire there will be too much cord and the ply ends will not be snuggly wrapped around the bead and a "buckling" or wrinkled condition will insue in the plies of the cured tire. The tire design engineer must find the proper conditions that will give him the exact cord length so each ply will have the same tension upon shaping and therefore, carry its share of the load. If the cords of the tire are too tight, the risk of the ply turn-ups being weakened upon expansion exists, and if they are too loose, buckling will result with the buckled plies not supporting any of the load on the tire and tending to become parasitic.

In devising the method of this invention, the inventor employed a completely new concept in calculating the proper factors to construct the tire and utilize the new method. The inventor used as the drum width of the building drum the sum of the actual drum width plus twice the width of the first bead. All of the cord bias angles, tire expansion, and cord lengths were considered to obtain this drum width and not the drum width as conventionally determined. The drum width of the building drum is conventionally calculated by using the ply material which would be located at the toe of the first bead in a vulcanized tire as the drum's terminal point. In FIGURE 2 the contour drum gives a bead construction essentially in the same form as it would appear in a vulcanized tire. The plies do not rotate around the bead bundles to any appreciable extent. Calculations are made based upon point A, which is actually the toe of the first bead bundle as it appears in the vulcanized tire (see FIGURE 1). Because of the lack of rotation, the ply material located at point A essentially remains at the same location in the vulcanized tire. In a flat drum built tire there is a rotation of the plies around the bead bundle during the shaping process. In a conventional single bead tire built on a flat drum, the location of the ply material that would be at the toe of the bead in the vulcanized tire is at point B in FIGURE 4. This is due to the rotation of 90°, one fourth of the circumference of a circle, that the body plies undergo in the shaping process. The tire design engineer would calculate his cord length to point B with a conventional single bead, flat drum built tire. Of course, this type tire is built by first placing the plies on the drum, turning them down over the drum edge, setting the bead bundle, and turning the ply ends up around the bead bundle engulfing it. This procedure and construction is shown in FIGURE 2 on a contour drum.

Using this conventional method and construction to build a twin bead tire on a flat drum would result in an accurate calculation for the cord length of the plies to be wrapped around the first bead bundle, but there would be no way to accomplish a correct cord length and ply width for the second bead bundle. If the bias angle of the first bead plies were used, wider plies would be required to wrap around the second bead bundle and would therefore, have cord lengths too long which would result in buckling in the cured tire. The bias angle could not be varied sufficiently from that of the first bead's plies to give the necessary shorter cord length, since differential actions would result within the inner and outer ply structure, and such a tire would be subject to separations and early failure.

To overcome this impossibility that existed with the prior conventional twin bead construction when built on a flat drum, the inventor devised the method of constructing a tire bringing all the body plies down between the bead bundles and wrapping the outer plies up around the outermost bead. Also the point C in FIGURE 4 was used as the terminal point in determining the cord length and subsequent drum width. By this expedient the correct cord length and proper expansion were obtained for all the body plies and the use of the flat drum was made possible. With point C being the reference point for the drum width, the effective drum width is actually the drum width of the drum itself plus twice the width of the first bead. This width is determined by calculating the width of the first ply to reach the point C (ply 64 in FIGURE 4) taking into consideration the drum's width, twice the width of the first bead, and twice the bulk of the plies applied prior to ply 64. The ply material at point C in the green tire (FIGURE 4) actually rotates 90 degrees upon shaping and is located at point D shown in FIGURE 3. Using this dimension as the cord length for calculation purposes and conventional calculations, the inventor has been able to construct a twin bead tire on a flat drum and thereby obtain the prior discussed advantages of flat drum building over contour drum building.

Prior to this invention, it was thought to be impossible to construct a twin bead tire on a flat drum. There was no way to allow for the needed ply rotation around the bead that is present in all flat drum built tires and no way to provide the proper cord length and drum width for all the body plies.

The tires depicted in the drawings are all tube type tires, but the invention is not so limited and is applicable to tubeless as well as tube type tires. Likewise, the cords in the plies may be any of the known tire cords, that is, rayon, nylon, N–44 nylon, polyesters, cotton, wire cords, fiber glass, etc., or any combinations or blends thereof. The cord plies are also rubberized by calendering a thin layer of rubber on each sides of the plies as is commonly known in the art.

The tires depicted in the drawings all have a like number of inner, and outer body plies. The number of body plies, along with their placement may be varied without departing from the method of this invention. For example, the tie-in shown in FIGURES 6 and 7 is a 3–3 tie-in, this may be varied to a 2–4 or 4–2 and the 4–4 tie-in in of FIGURES 3, 4 and 5 may be 2–6, 3–5, 5–3, 6–2, etc.

It is understood that variations in the method of manufacturing and the tire construction itself may be made without departing from the spirit of the invention.

I claim:

1. In the method of building a twin bead pneumatic tire on a flat building drum the steps comprising setting a first bead bundle at an edge of the flat annular drum, applying the body plies around the circumference of said drum, folding the ply ends of said body plies radially inwardly down over said first bead bundle, setting a second bead bundle co-axial with the said first bead bundle and axially outwardly of the said first bead bundle and the turned down ply ends, folding a first group of body ply ends against one bead bundle, and folding a second group of body ply ends against the other bead bundle.

2. The method of claim 1 in which said first group of body ply ends are folded against said second bead bundle and said second group of ply ends are folded against said first bead bundle.

3. In the method of claim 1, the steps comprising folding the first group of body ply ends axially and radially outwardly and folding said second group of body ply ends axially inwardly and radially outwardly.

4. In the method of claim 1, the intermediate step of removing the tire body from said flat drum prior to folding said second group of body ply ends against said other bead bundle.

References Cited

UNITED STATES PATENTS

| | | | |
|---|---|---|---|
| 3,244,575 | 4/1966 | Sabo et al. | |
| 1,664,259 | 3/1928 | Midgley | 156—123 XR |
| 1,836,057 | 12/1931 | Abbott | 156—132 XR |
| 2,790,482 | 5/1957 | Riggs | 156—132 XR |
| 3,305,427 | 2/1967 | Rehman | 156—132 XR |

BENJAMIN A. BORCHELT, Primary Examiner

S. C. BENTLEY, Assistant Examiner